United States Patent
Bowen

(10) Patent No.: US 10,823,432 B2
(45) Date of Patent: Nov. 3, 2020

(54) ELECTRIC HEATING SYSTEMS AND METHOD OF USE THEREOF

(71) Applicants: David Bowen, Wakefield (GB); Logicor (R & D) Ltd, Wakefield, West Yorkshire (GB)

(72) Inventor: David Bowen, Wakefield (GB)

(73) Assignee: Logicor (R&D) LTD, Wakefield (GB)

( * ) Notice: Subject to any disclaimer, the term of this patent is extended or adjusted under 35 U.S.C. 154(b) by 56 days.

(21) Appl. No.: 14/913,361

(22) PCT Filed: Mar. 24, 2014

(86) PCT No.: PCT/GB2014/050913
§ 371 (c)(1),
(2) Date: Feb. 20, 2016

(87) PCT Pub. No.: WO2015/025122
PCT Pub. Date: Feb. 26, 2015

(65) Prior Publication Data
US 2016/0201930 A1 Jul. 14, 2016

(30) Foreign Application Priority Data

Aug. 23, 2013 (GB) .................................. 1315141.0

(51) Int. Cl.
| | | |
|---|---|---|
| G05B 19/042 | (2006.01) | |
| G05B 15/02 | (2006.01) | |
| F24D 19/10 | (2006.01) | |
| H04L 12/64 | (2006.01) | |

(52) U.S. Cl.
CPC ......... F24D 19/1096 (2013.01); G05B 15/02 (2013.01); G05B 19/0423 (2013.01); H04L 12/6418 (2013.01)

(58) Field of Classification Search
CPC .... F24D 19/1096; F24H 3/004; F24H 9/2014; G05B 15/02; G05B 19/0423; H04L 12/6418
See application file for complete search history.

(56) References Cited

U.S. PATENT DOCUMENTS

| | | | | |
|---|---|---|---|---|
| 6,600,971 B1 * | 7/2003 | Smith | ..................... | G05B 15/02 700/17 |
| 9,151,508 B2 * | 10/2015 | Han | ........................ | F24F 3/065 |
| 2009/0174365 A1 * | 7/2009 | Lowenthal | .......... | B60L 11/1816 320/109 |
| 2010/0045470 A1 * | 2/2010 | Araiza | ...................... | F24D 1/00 340/603 |
| 2010/0133352 A1 * | 6/2010 | Jones | .................. | F24D 19/1096 237/12 |

(Continued)

FOREIGN PATENT DOCUMENTS

WO    WO 2011110832 A1 *  9/2011  ......... G05B 19/0423

*Primary Examiner* — Jennifer L Norton
(74) *Attorney, Agent, or Firm* — Goodhue, Coleman & Owens, P.C.

(57) ABSTRACT

An electric heating system is provided including first and at least second electric heating devices. The first and at least second electric heating devices each include or have associated therewith communication means, whereby data concerning all or one or more of the heating devices can be communicated directly to or between the first and at least second electric heating devices.

14 Claims, 2 Drawing Sheets

(56) References Cited

U.S. PATENT DOCUMENTS

| | | | |
|---|---|---|---|
| 2011/0251731 A1* | 10/2011 | Yang | H02J 3/14 |
| | | | 700/296 |
| 2012/0253521 A1* | 10/2012 | Storm | G05D 23/1905 |
| | | | 700/276 |
| 2013/0166075 A1* | 6/2013 | Castillo | F24F 11/0012 |
| | | | 700/277 |
| 2013/0178996 A1* | 7/2013 | Li | G06F 1/30 |
| | | | 700/295 |
| 2013/0245849 A1* | 9/2013 | Paul | H02J 3/14 |
| | | | 700/295 |
| 2014/0076884 A1* | 3/2014 | Boulos | G05D 23/1919 |
| | | | 219/494 |
| 2014/0225603 A1* | 8/2014 | Auguste | G01R 21/00 |
| | | | 324/244 |
| 2014/0326796 A1* | 11/2014 | Kymissis | F24D 19/0087 |
| | | | 237/12 |
| 2019/0026359 A1* | 1/2019 | Park | G05B 15/02 |

* cited by examiner

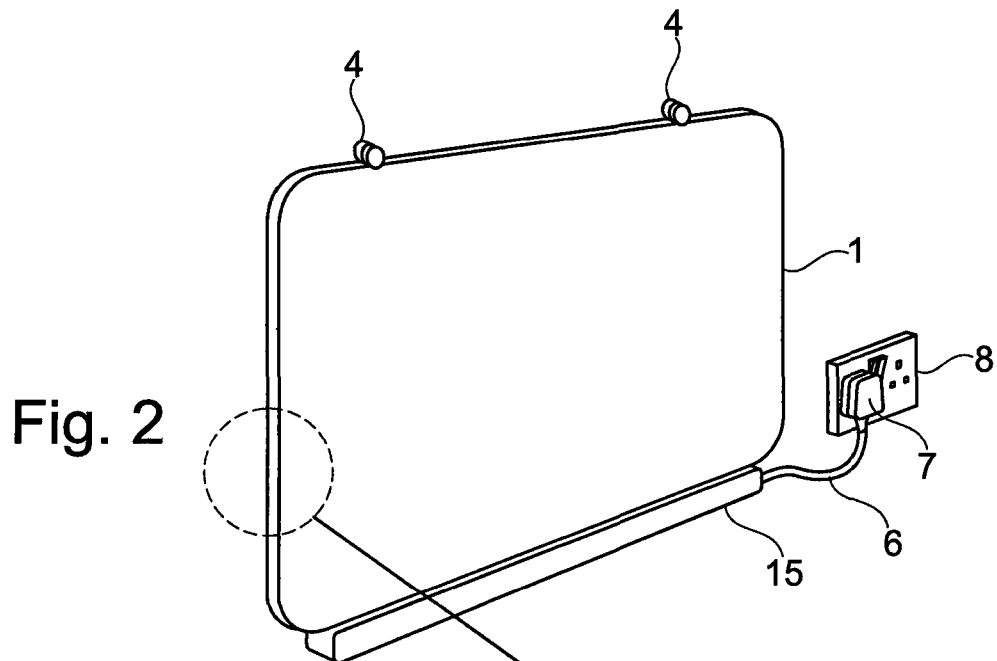
Fig. 2
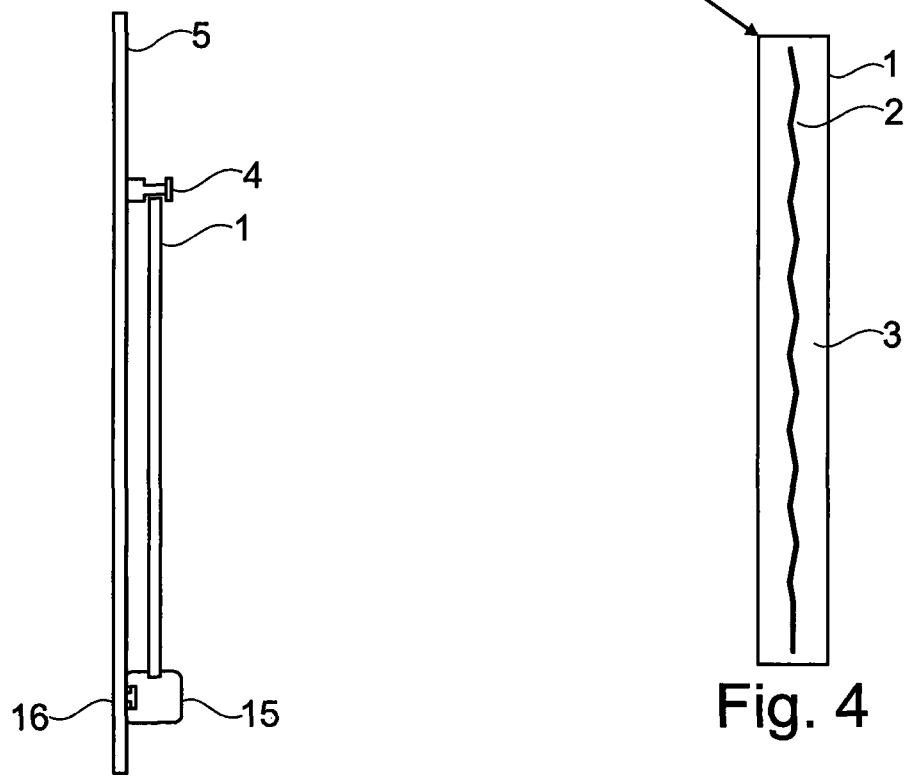
Fig. 3
Fig. 4

ELECTRIC HEATING SYSTEMS AND METHOD OF USE THEREOF

FIELD OF THE INVENTION

The invention to which this application relates is an improved electric heating device, a system incorporating the improved electric heating device and a method for controlling the same.

Although the following description refers exclusively to an electric heating device in the form of an electric radiator, it will be appreciated by persons skilled in the art that the present invention can be used with many other heating devices such as cookers, water heating devices and/or the like, as well as systems containing the same.

BACKGROUND

Electric heating devices such as radiators, convectors and other heat exchangers are well known and are used for domestic and commercial heating purposes. Radiators are commonly used for space heating, for example heating the air in a room as part of a central heating system.

Electric radiators generally comprise an element through which electricity flows to generate infra-red radiation/heat. The element may be surrounded by panels from which the heat is radiated. The panels are often arranged to increase the surface area and thus the speed of radiation. The element may be surrounded by oil, water, gas, glass or some other heat conductive substance that the element heats.

The life expectancy of electric radiators is typically limited to two or three years occasional use. The life expectancy is limited primarily to the life of the element used in the heater, the frequency and accumulated time that element is working or connected to the mains electricity and switched on.

Often electric radiators are provided with a thermostat to control the heat output. Typically the thermostat monitors the temperature of the radiator and/or the air temperature of the location in which the radiator is placed and switches the heating element off when the desired temperature is reached. The radiator is switched back on again when the temperature has fallen below a threshold value.

It is known to provide electricity measuring devices which measure the consumption of electricity in domestic premises to allow a user to monitor their electrical usage of all their electrical appliances within a particular locality, such as a user's home, at a particular moment in time. However, conventional electricity measuring devices do not typically allow a user to control the electrical consumption of their electrical appliances via the electricity measuring devices or gain any additional information therefrom.

WO2011110823 discloses a system whereby a control of a plurality of heating devices can be achieved using a separate control unit, the content of which is incorporated herein by reference.

SUMMARY OF THE INVENTION

It is an aim of the present invention to provide an electric heating device and system containing the same that addresses the limitations of the abovementioned systems.

It is a further aim of the present invention to provide an electric heating device and system that is independent of or without a central control unit.

It is a further aim of the present invention provide a method of using an electric heating device and system including one or more electric heating devices.

In a first aspect of the present invention there is provided a heating system including first and at least second electric heating devices, wherein the first and at least second electric heating devices each include or have associated therewith communication means, whereby data concerning all or one or more of the heating devices is communicated directly to or between the first and at least second electric heating devices.

Thus, according to the present invention, information and/or data can be communicated directly between a plurality of electric heating devices that make up the system independent of or without having to communicate via a separate unit, such as a central control unit. The information or data capable of being communicated and/or controlled by the system typically concerns any one or any combination of; the temperature of one or more of the heating devices; the ambient temperature of the location of one or more of the heating devices; a temperature variation from a predetermined threshold value or range, the operating and/or functional condition of one or more of the heating devices, for example if the device is currently on, off, in standby mode, in need of repair or maintenance and/or the like; the amount of energy one or more of the heating devices is using; the amount of carbon being used and/or the carbon footprint of one or more of the heating devices and/or the like. The data can relate to one or more measurements take at one or more particular time points and/or over one or more time periods.

Preferably the first and at least second electric heating devices each include a heating element or heating means provided in or associated therewith.

Preferably information and/or data can be communicated directly from the first heating device to at least the second heating device. Preferably the communication is at least two way between the heating devices comprising the system. Thus, in one embodiment, each or one or more heating devices is capable of transmitting data to one or more other heating devices and is capable of receiving data from one or more other heating devices.

In an alternative embodiment, one of the heating devices in the system is determined to be the "master" heating device and communicates data and/or controls one or more "slave" heating devices in the system.

Preferably the communication means of at least one of the heating devices is associated with, forms part of, communicates with and/or is connected to control means. The control means typically controls one or more parameters, functions and/or characteristics of said at least one heating device and/or one or more other heating devices in the system.

In one embodiment at least the first heating device includes a control means. Further preferably each heating device in the system includes a control means. Yet further preferably each heating device includes a control means and a communication means.

In one embodiment the control means is suitable for controlling one or more of the electric heating devices. Preferably the control means includes or is associated with switching means for controlling or switching the supply of electricity to said one or more electric heating devices according to one or more parameters, functions and/or characteristics, such as for example, user selected parameters, service provider selected parameters and/or pre-determined parameters.

Typically said one or more parameters, functions and/or characteristics include the amount of energy consumable by said one or more electric heating devices in use.

Further typically the present invention provides a heating system whereby the control means for each heating device is in direct communication with the control means on at least one other heating device within the system and preferably all the other heating devices within the system. This allows a user to determine how much electrical energy an electric heating device is able to or is allowed to consume in use in a particular time period (i.e. the electrical consumption of an electric heating device can be determined by a user). This is in contrast with conventional electric heating devices whereby a thermostatic control or a timing device associated with the electric heating device determines when the electric heating device is moved between different operational conditions, such as an "on" and/or "off" condition. Whilst a user can select the temperature of a thermostatic control of a conventional heating device, the user typically has no direct control over the wattage, the amount of money being spent or the amount of energy required to achieve the user selected temperature in the heating device. The present invention overcomes this problem by providing a user with a level of control over their energy consumption that was not previously possible. Furthermore, a user can control the heating of a plurality of heating devices by using the control means on at least one of the heating devices and does not require a separate or independent control means or unit to be provided.

Thus, according to the present invention, each individual heating device of the system can be used to independently control itself or one or more other heating devices within the system.

Preferably the amount of consumable energy selectable by the user using a control means on at least one of the heating devices in the system is defined in terms of carbon footprint (i.e. tonnes of carbon used), wattage of electricity and/or the cost of the electricity used by each or one or more of said electric heating devices. Thus, in one example, the control means allows a user to control a heating device according to what they can afford to pay or what they are prepared to pay for heating said electric heating device. In a further example, if 1 Kw of electricity costs £1.00, the user can use the control means to select that £2.00 or 2 Kw of electrical energy can be supplied to a particular electric heating device at a particular time or in a pre-determined time period.

Preferably one or more other parameters, functions and/or characteristics that can be controlled per se and/or selected by a user using the control means of a particular heating device and/or a central control means include any or any combination of; the communicated data types mentioned above, a time period over which energy consumption for one or more of said heating devices is defined, a temperature or temperature range of one or more of said electric heating devices, a rate or amount of heat loss in a particular locality (i.e. the rate of heat loss in a particular locality could determine whether the switching means is actuated), a date and/or the like. For example, the switching means can be actuated for a predetermined length of time, each heating device being switched on for a predetermined period then switched off. The time period could be fractions of a second, seconds, minutes, hours, days, weeks, months, years and/or the like. Thus, a user could set the control means so that a certain wattage is used by a designated electric heating device over a certain time period in order to achieve a certain temperature or temperature range of said electric heating device.

In one embodiment a value range and/or an upper and/or a lower threshold limit for a particular parameter, function and/or characteristic being controlled and/or data item being communicated is predetermined and/or can be selected by a user. For example, the user may set a control means so that no more than £10 is used by the system or a particular heating device. Alternatively, or in combination, the user can select for a particular heating device or set of heating devices not to use more than a designated amount of energy/money/carbon in a selected time period. Once the wattage corresponding to this amount of money is spent or used, the switch means could be moved to an off position.

Preferably each of the plurality of electric heating devices has a switch means provided with or associated with the same. A single switch can control two or more electric heating devices or a single switch can control each electric heating device independent of any other heating device.

In one embodiment the control means are arranged to actuate the switch means of two or more of the plurality of electric heating devices successively (i.e. one after another and/or in a particular sequence).

In one embodiment the control means of at least one of the devices is able to control each heating device according to the energy consumption selected by the user for each heating device, all heating devices or one or more heating devices.

In one embodiment in order to allow one or more or all of the heating devices to operate within, above or below the selected or predetermined parameter(s), function and/or characteristic, at least one heating device in one embodiment is not switched on all the time or is provided with a reduced electric power supply for part of a total time period relative to a remaining time period. The system can successively supply or receive electric energy to each radiator or heating device in turn for a short pre-determined time period. One or more other heating devices in the system may be switched to an off or relatively low power consuming position when one or more heating devices are switched to an on or relatively high power consuming position in one example.

In one embodiment a single control means controls the plurality of heating devices substantially simultaneously. The control means can be located on or associated with one of the heating device or can be a stand alone, remote and/or independent control means.

Preferably at least one device control means controls actuation of the switch means of said heating device, one or more other heating devices or all said heating devices between "on" and "off" conditions or "high" and "low" conditions. The electric heating devices typically are capable of being heated when in an "on" condition and cannot be heated when in an "off" condition (although could still be capable of heating due to existing heat present in the device).

In one embodiment each electric heating device is arranged a spaced distance apart and/or remotely from another or other electric heating devices in the heating system. Typically the electric heating devices are provided in a building with a plurality of rooms. For example, one or more electric heating devices can be provided in one or more or all rooms of a house.

In one embodiment electric power or voltage supplied to one or more of the heating devices is pulsed (i.e. moved between on and off conditions or relatively high and low conditions) to the electric heating devices, and preferably pulsed sequentially to two or more electric heating devices.

For example, where a control means controls only two electric heating devices, the switching means can move the electrical supply between "on" and "off" conditions or relatively "high" and "low" conditions two or more times within a particular selected parameter time period. The terms "high" and "low" are relative terms, such that "high" refers to a significantly higher power consumption compared to a "low" condition.

When a control means controls two or more electric heating devices, each heating device preferably receives one or more electric pulses in turn/successively.

As the control means actuates the switching means to switch on and off the electric heating devices successively i.e. sequentially, rather then simultaneously, one or more electric heating devices can remain in an operational or "on" or "high" state whilst one or more other electric heating device are in a non-operational, "off" or "low" state. Thus, several rooms can be heated by respective electric heating devices without completely switching off the electric heating devices in all rooms during the operation.

In one embodiment one or more parameters, functions and/or characteristics associated with or selected for each heating device or two or more different heating devices being controlled are different to allow each heating device within the system to operate under different parameters and/or conditions if required. For example, a user could set a heating device located in a living room of a house to use a larger amount of energy or wattage than a heating device located in a hallway of a house since the living room may be used more frequently and for longer time periods by the user or other users compared to the hallway.

In one embodiment, the one or more electric heating devices are any or any combination of one or more electric radiators, fan heaters, cookers, hair straighteners, electrically-controlled water heating devices, kettles, boilers and/or the like.

Typically the one or more electric heating devices are powered by mains electricity.

In one embodiment the communication means are provided on each heating device and are arranged to allow communication between the switching means on each electric heating device.

Preferably the communication between two or more heating devices is unidirectional or bidirectional. In one embodiment the communication between a plurality of heating devices is multidirectional.

Typically the communication means allow one or more signals to be sent and/or received by the control means and/or the switching means using wireless means, electrical wiring and/or cabling associated with the one or more electrical heating devices (i.e. such as an existing electrical cable) and/or the electrical wiring and/or cabling associated with the electrical supply of the locality, room and/or building in which the one or more electrical heating devices are located in use.

Further typically the one or more signals communicate data between the control means on the electric heating devices, such as for example data relating to the one or more user selected parameters or predetermined parameters.

In one embodiment the signals or data signals are carried by the ring main or mains electric wiring or cabling provided in the locality, room, building and/or property in which the electrical device is located in use. Typically the one or more signals are high frequency signals (i.e. alternating current or voltage signals, radio frequency signals and/or the like) so that interference with the existing electrical signals (i.e. direct or low voltage signals) is minimised.

In one embodiment the signals or data signals are any or any combination of wireless (WiFi) signals, radio frequency (RF) signal, infrared signals, light signals and/or the like. In one embodiment the communication means include transmitters and/or receivers relating to any or any combination of (WiFi) signals, radio frequency (RF) signal, infrared signals, light signals and/or the like.

In one embodiment sensing means are provided for sensing the temperature of each or one or more of the electric heating devices.

In one embodiment sensing means are provided for sensing the temperature of the location of one or more electric heating devices. The sensing means can be provided on or associated with the heating device, the control means, the communication means and/or the switch means.

In one embodiment the control means and/or the temperature sensing means can use the one or more selected parameters to calculate the required temperature of one or more electric heating devices.

In one embodiment the switch means could be associated with or provided in or on any or any combination of an electric plug, a wall socket, a fuse spur, microprocessor controlled relay and/or the like forming part of or associated with the electric heating device. The communication means and/or sensing means could be associated with or provided in or on any or any combination of the electric plug, wall socket, fuse spur and/or the like associated with the electric heating devices.

In a preferred embodiment each electric heating device is provided with a control box and/or plug into which communication means, sensing means, and/or the switching means are incorporated. The plug can be provided, for example, at one end of an electrical cable, the other end of which is attached to the electric heating device.

Preferably the switch means, communication means and/or sensing means can be retrofitted to a conventional electric heating device in use. For example, a control box or a plug according to the present invention could be provided on the end of an electrical cable of a conventional electric heating device, or the switch means could be hard wired into a fuse spur. Thus, the present invention can be retrofitted to any existing electric heating devices or systems as required by the user.

In a further preferred embodiment communication means, sensing means, and/or the switching means are incorporated into or are associated with each electric heating device.

Preferably each heating device, or control means, switching means, communication means and/or plug associated with a heating device includes identification means to allow other heating devices, control means, communication means, switching means and/or plug forming part of the system to identify the same. This allows a user to set one or more different parameters, functions and/or characteristics for different electric heating devices in the system.

In one embodiment a single control means controls a plurality of electric heating devices. In one embodiment a single control means is provided on or associated with each or one or more of the heating devices.

In either of the abovementioned embodiments, preferably the control means includes means for allowing user selection of said one or more parameters, functions and/or characteristics. In one example, the control means can include any means which can run a software application thereon. Typically the control means and/or the communication means includes at least one microprocessor.

Preferably a user interface is provided with the control means to allow a user to select and/or control said one or more parameters, functions and/or characteristics and/or to determine how the switching means of one, each or a plurality of electric heating devices is to be controlled.

Preferably at least one control means includes any or any combination of a visual display and/or touch screen display to allow the display and/or selection of the one or more parameters, user-interface, micro-processing means for processing data relating to the one or more parameters, data signals and/or the like, memory means for storing data, one or more control buttons, levers, dials and/or the like.

Preferably at least one control means allows a user to measure and/or monitor electric consumption of one or more electric heating devices, preferably for any particular time or time period, in addition to selecting the value or upper and/or lower limits of said electric consumption.

In one embodiment at least one control means stores data relating to electric consumption in memory means or a central repository. Typically the data can be used to make decisions regarding optimisation of the heating performance of any device and/or the system as a whole.

In one embodiment the control means are programmable by the user. Typically the control means allows the user to specify a temperature for one or more localities, one or more rooms, the temperature of an electric heating device and/or the like.

In one embodiment at least one communication means can send and/or receive data outside of the system. Typically at least one communication means is connected to the Internet.

In one embodiment one or more control means and/or communication means may be accessed remote from the system location. Typically a control means is accessible via a remote computer or over the internet via the communication means. Thus, in one example, a user can amend, adjust and/or monitor energy consumption, time, temperature and/or the like remotely.

In one embodiment the communication means can communicate with one or more external data sources or external service providers. Typically the data sources provide data relating to possible control parameters for the system. Further typically the communication means can access externally derived data parameters to provide automatic control of the heating system. For example, the externally derived data parameters could include any one or any combination of weather forecast data, electricity supplier data, emergency service provider and/or historical data from other independent heating systems. Thus, in one example, if the weather data indicates a cold spell on the way, the heating system may adjust one or more parameters of said system to take this into account without requiring user intervention. The control means of the system or one or more heating devices can act on the external data received accordingly.

In one embodiment the communication means can access data from one or more energy suppliers. Typically the communication means can access tariff data and/or the like. Further typically at least one control means can control the heat output of a device such that the heating can be at the most cost effective for a particular tariff.

In one embodiment the communication means and/or control means may be arranged to automatically switch energy supplier. Typically this can be performed remotely often without the need for intervention. Further typically this ensures that the system uses the cheapest electricity available to it. This can be performed over the Internet or using a memory means.

In one embodiment the system and/or one or more electric heating devices is arranged to detect or sense a sudden change in temperature, an unusual or unexpected change in temperature and/or a substantial change in detected temperature at one or more localities relative to a pre-determined temperature value or temperature range. Such a change can be communicated to a user and/or suitable authority. The user and/or suitable authority can be located at the same location as the system and/or can be located remote from the system. The detected temperature change could indicate a possible fire, open and/or broken door or window, show an intruder, water pipe leak, flood, and/or mechanical failure of one or more components of the system. The user could be a home owner in one example. The suitable authority could include a fire brigade, police, emergency service provider, alarm provider, water authority and/or the like.

The detected temperature could be a pre-determined value or value range and/or could be measured of a pre-determined time or time period.

For example, if a sudden and large increase in temperature is detected, such as for example in excess of 50 degrees, this could indicate a fire at a location at or adjacent one or more of the electric heating devices. A smaller drop in temperature, such as a drop of 1-2 degrees in a locality, could indicate a window or door has been opened or left open.

In one embodiment the system, one or more heating devices, control means and/or communication means is connected to or includes a memory or data storage means. Typically the memory or data storage means includes data relating to different parameters such as energy consumption, time, temperature, date and/or the like. A comparison of present operating conditions of one or more heating devices can be made against saved historical or test operating conditions to allow the system to determine what adjustment should be made to one or more parameters, characteristics and/or functions being controlled. This adjustment can be made automatically by the system.

In one embodiment the memory or data storage means includes an SD or other such memory card.

Typically the control means determines when each of the electric heating devices is switched on and off via the switching means and/or how long each electric heating device is switched on and/or off for.

In one embodiment a fraction of the plurality of electric heating devices are switched on at any specific time. Typically no more than one electric heating device is powered at any given moment.

In one embodiment the length of time each electric heating device is powered for or a pulsed electric supply is provided for is substantially equal to a second (in time, i.e. a $60^{th}$ of a minute) divided by the number of electric heating devices in the system controlled by at least one control means.

Thus if a control means is in communication with 25 electric heating devices, the first device will be switched on for 0.04 seconds then switched off, then the next device will be switched on for 0.04 seconds then switched off, and so on until the last device, whereupon the cycle repeats.

Of course it will be appreciated that any suitable length of time can be used in connection with supplying power to the electric heating devices, and the above example is intended to be non-limiting.

In effect, the supply of electricity is 'moved' from one electric heating device to the next at a very fast rate and takes advantage of the fact that it takes a long time for an electric heating device to cool down once hot. Thus, electricity or electrical consumption is 'swapped' very quickly from a device that is fully up to temperature to another one that is cooler, which keeps all electric heating devices in a system hot but uses the same amount of electricity to do so as would be used for heating a single heating device.

As such, the total amount of power required by the plurality of electric heating devices in a system according to the present invention substantially equates to that of just one of the electric heating devices.

In addition, in one embodiment, it will be appreciated that more than one electric heating device may be powered at a given time as long as the total energy consumption remains within the capabilities of the circuit and/or the user selected value or range.

For example, if each electric heating device is rated at 1 kW, and the circuit is capable of supplying 3 kW or the user has selected 3 kW of electrical energy to be supplied, it would be possible to power two or three electric heating devices simultaneously.

In one embodiment a user can prioritise or order the electric heating devices in a particular hierarchy using the control means, so that only a prioritised electric heating device or an electric heating device given priority or is high up in the hierarchy is powered, for example, if the user selected energy consumption is too low to power all the electric heating devices. This enables the switching means associated with one or more electric heating devices to be actuated in a user selected order.

In one embodiment one or more of the electric heating devices are made from or includes ceramic and/or glass material in which a heating element is embedded or sandwiched.

In one embodiment each electric heating device has dimensions of approximately 100 cm wide by 50 cm high by 1 cm deep.

Typically the electric heating devices may be hung onto a wall by means of a bracket or other suitable fixing means.

In a second aspect of the present invention there is provided an electric heating device suitable for use in a heating system. The device typically includes at least one communication means capable of communicating directly with a further heating device and/or the internet in use.

Preferably the communication means is part of the control means for the device. Typically the control means is integrally formed in the electrical heating device.

In one embodiment the control means and/or the communication means included a modem unit.

In a third aspect of the invention there is provided a method of using an electric heating system, said system including first and at least second electric heating devices, wherein the first and at least second electric heating devices each include or have associated therewith communication means, and wherein said method includes the step of communicating data directly from one of said heating devices to at least one other of said heating devices.

In a further aspect of the invention there is provided a heating system including one or more electrical heating devices, wherein at least one of the devices includes communication means to communicate with one or more external data sources.

Typically the external data sources are a source of data or externally derived data parameters that can be used to control the heating system. Further typically the data or externally derived data parameter include any one or any combination of weather forecast data, electricity supplier data, tariff data, historical data and/or the like.

In a yet further aspect of the present invention there is provided a heating system including one or more electrical heating devices, wherein at least one of the devices can detect a temperature change above and/or below a predetermined threshold value or range and, on detection, one or more alarms are initiated, one or more users are notified and/or one or more suitable authorities are notified. For example, this system could be used to inform one or more appropriate parties of a fire, flood, intruder, open door or window and/or the like.

In a further aspect of the invention, there is provided a central heating system including a plurality of electric heating devices including control apparatus as herein described.

In a yet further aspect of the present invention there is provided control apparatus for one or more electric heating devices including switching means to selectively control the supply of electricity to each electric heating device, characterised in that control means include communication means.

In one embodiment each electric heating device is repeatedly supplied with electricity for a predetermined period of time.

Typically, each electric heating device is supplied with electricity at different times to the other electric heating devices.

In one embodiment the control means is accessed and/or programmed remotely by a user.

BRIEF DESCRIPTION OF THE SEVERAL VIEWS OF THE DRAWING

Specific embodiments of the invention are now described wherein:—

FIG. 2 illustrates a perspective view of an electric heating device in accordance with one embodiment of the invention;

FIG. 3 illustrates a side view of an electric heating device in one embodiment; and FIG. 4 illustrates partial sectional view of an electric heating device in one embodiment.

DETAILED DESCRIPTION OF THE INVENTION

Figure 1:
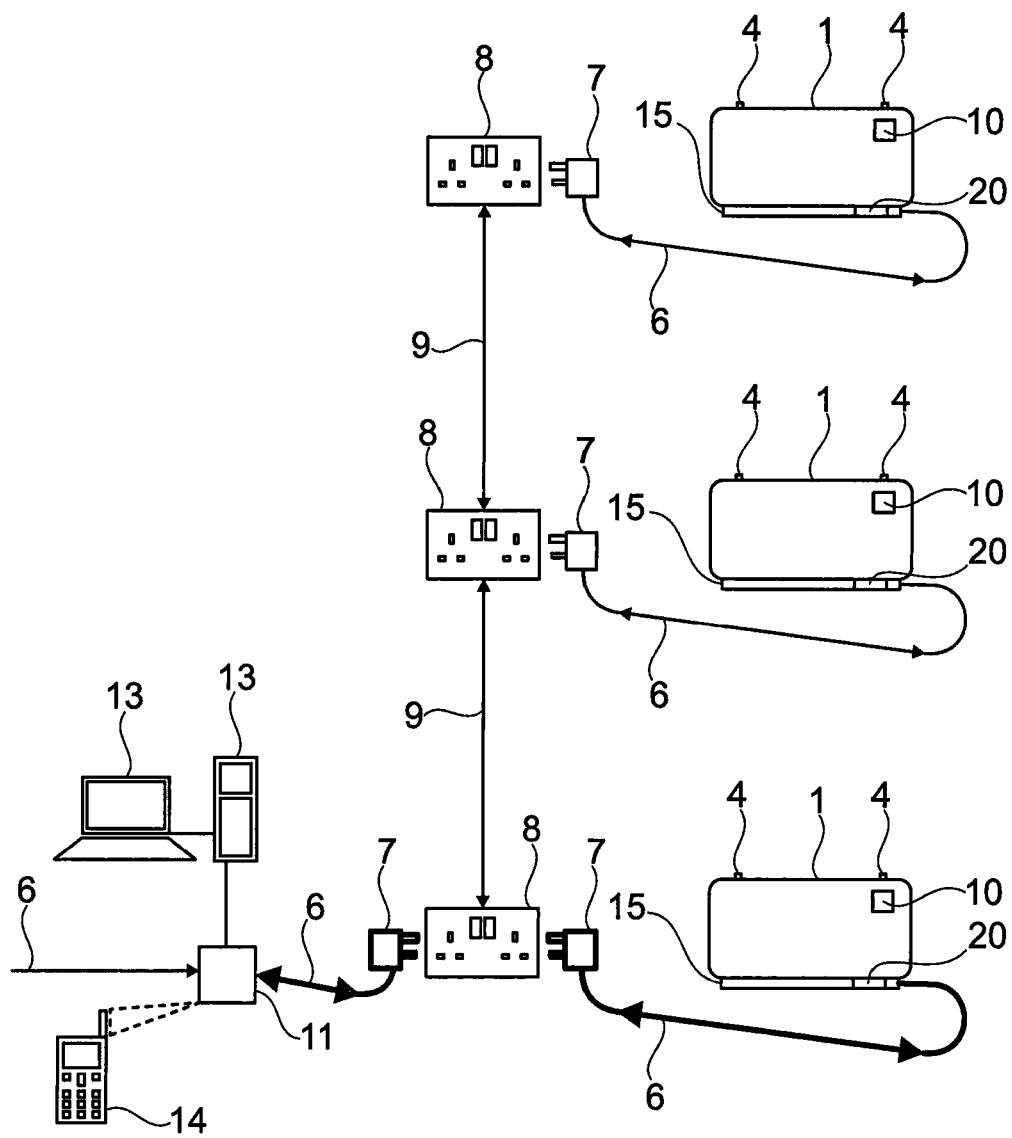
FIG. 1 illustrates a schematic view of a central heating system comprising a plurality of electric heating devices and control apparatus according to one embodiment of the present invention.

With reference to FIG. 1, there is illustrated a central heating system for a house comprising a plurality of electric heating devices in the form of electric radiators 1. The radiators may be located in different rooms of a house (not shown).

The electric radiators are provided with electrical cables 6 and plugs 7 to allow the same to be plugged into the mains electrical circuit via nearby sockets 8 in a conventional manner.

Each radiator also includes control means 10 for controlling the heat output of the radiators, and communication means 20 so that information or data relating to the control of heat output can be communicated directly between the radiators and their control means.

The plugs 7 provided with each electric radiator are utilised by the communication means to allow communication therebetween via the mains electrical circuit 9 which already exists in the house. Thus, both electrical voltage and one or more communication signals can travel along the mains electrical circuit between the control means and the plugs to allow control of the electric radiator according to one or more parameters selected by the user using the control means.

One type of control means is in the form of a control panel 10 that is formed integrally with the radiator. The location of the control panel 10 on the radiator can be any suitable location, such as on the main body of the radiator, on a frame supporting the radiator, on a plug or electrical cable of the radiator and/or the like. The control panel 10 can include a display screen for display of data and/or one or more user selectable options thereon, and control buttons to allow user selection of one or more parameters displayed on the display screen and/or associated with the electric radiators 1. Micro-processing means provided in the control panel allows one or more software applications to be run thereon which can provide a user interface to allow selection of the one or more user selectable parameters, to allow the display of one or more measured and/or monitored parameters and/or the like.

Additional control means can include a computer or independent micro-processing means 13 connected to the mains electrical circuit, or a mobile internet device 14 in remote communication with the mains electrical circuit via a modem/router 11 and/or the like. The computer/device 13 or mobile internet device 14 could control the electric radiators via a central control panel (not shown) which in turn controls the electric radiators directly.

Thus, a user can control the central heating system at locations within the house using a control panel on one of the radiators, using a central control panel within the house and/or from locations remote from the house and the one or more electric radiators using an electronic device linked to one of the radiators control panels.

In accordance with the present invention, the control panel or control means allows a user to select at least the amount of electric energy, typically defined in wattage and/or cost, that one or more or all of the electric radiators in the system are to consume within a selected or pre-determined time period. The control panel or control means can also allow a user to select the time period and/or date over which the electrical consumption limit or value is to take place, the temperature of one or more of all of the electric radiators in the system and/or the like.

For example, when a plurality of electric radiators are used within a house or other location, a high electrical demand is placed on the circuitry of the house. For example, if four 3 kW radiators are simultaneously plugged into the same circuit, this creates a load of 12 kW. However, the maximum fuse size for most domestic circuits is 30 A which corresponds to a load of around 7 kW, and thus in the aforementioned example the circuit fuse would be blown or tripped. Of course the fuse rating for a particular circuit may be even less such that no more than one electric radiator may be supported without tripping the circuit.

In addition, the cost of the electricity associated with continuously supplying electricity to all four 3 KW radiators to allow heating of the radiators to a required temperature is likely to be high. However, it is typically difficult for a user to calculate how much electricity the heaters are using in use due to a plurality of variables that may affect how long the radiators are switched on/off for as controlled by the radiator thermostats. For example, each radiator may take a different period of time to reach a user selected thermostatically controlled temperature and/or maintain said temperature depending on the ambient conditions of the locality in which the radiator is located. In addition, each radiator could be set to a different thermostat temperature depending on the locality in which the radiator is located. The user would therefore be required to calculate the power consumption for each radiator separately taking into account all variables, which is time consuming, complex and requires a certain level of skill and knowledge on the part of the user. A central control panel or the control panel 10 of each radiator can be set to automatically switch between tariffs by accessing tariff data and other data sources external to the system via a suitable connection to the Internet and/or the World Wide Web.

The plugs 7 of each electric radiator 1 are provided with switching means under the control of the control panel and/or control means, such that electric power or wattage can be supplied successively to each of the radiators by automatically switching the radiators on and off in sequence, such that only one radiator is switched on at any one time. The switching means only allows a pre-determined wattage to pass to each radiator in accordance with the user selected parameters set via the control panel.

The control apparatus formed from the control means and switching means allows the user to program the central heating system, via the control panel, such that a particular room can be heated without switching off the radiators in other rooms during the operation.

Thus, the radiators in the system can be supplied with electricity sequentially so that only one (or a limited number) are powered at any given moment. In the illustrated example of a system of five radiators, each can be successively switched on and off for 0.2 s so that all the radiators are heated without overloading the circuit and whilst using wattage below the user selected upper limit.

Similarly, if the user sets the control panel to only power the first three radiators, and then later the other two are programmed to come one, none of the radiators have to be switched off when this occurs as the control panel distributes power sequentially to all the radiators. Of course in this example as the two radiators powered later are cold to start with (relative to the other three), the time for which they are powered may be programmed to be longer than that for the radiators which are already hot.

Thus, the present invention provides means for each heater within a particular locality to communicate with other heaters in said locality to allow data exchange and to problem solve. An example would be a heater in a bedroom set to maintain a temperature of 22.3 degrees may be adjacent to a bathroom where a heater is set to maintain a temperature of 19.8 degrees. With a conventional heating system, if both rooms experience a drop in temperature of 1 degree, both heaters would be triggered to be moved to an "on" condition to increase the temperature by 1 degree. However, in the present invention, the heater in the bathroom may determine from its historically stored data and parameters that switching the bedroom heater on is sufficient to allow both the bedroom and bathroom to be heated to the required temperature within a predetermined time period without the bathroom heater being switched on.

The ability of the system as a whole to communicate data externally of the system via a central control panel or one or more control panels associated with a heating device, allows collective and more efficient problem solving to be undertaken by the system. For example, a heater in a house in Leeds can look up how other heaters are performing or setting parameters under similar conditions in a different house in Scotland.

The heaters of the present invention are able to take collective action to attain an end goal using data from all the heaters. For example, to achieve a temperature of 23 degrees most efficiently, it may be beneficial for all the heaters to act as one and feed off the heat being generated by the heaters as a whole, rather than each heater considered independently.

With reference to FIG. 2-4, the electric radiator in one embodiment comprises a panel of ceramic or glass material 2 in which a heating element 3 is embedded. The electric radiator can be hung on a wall 5 via brackets 4, 16 in a conventional manner.

In accordance with the present invention, the control panel or control means allows a user to select temperature of in excess of 50 degrees which each all of the electric radiators in the system will notify the control panel once that temperature is exceeded. The control panel or control means can also allow a user to detect an unexpected heat source and potential fire in the proximity of any of the electric radiators. This can be referred to as a "Fire Guard" function and once activated the control panel or heater can contact the authorities, home owners or indeed anyone it is told too to notify them of the potential fire, it's location, current temperature and other data as required.

In one embodiment of the present invention, the control panel or control means allows a user to be informed of sudden or rapid temperature changes exceeding a predetermined threshold or value, such as for example exceeding 1 degree from a pre-set value. One or more or all the electric radiators in the system can notify the control panel or control means once the monitored temperature has exceeded the pre-set temperature. This can be as a result of a window or door in the vicinity of one or more of the radiators being opened or being left opened and could be used to inform a user of an intruder in their home, of a water leak and/or the like. This can be referred to as a "Home Guard" function. In one example, one a pre-set temperature variation has been detected by the system, the control means and/or control panel can contact appropriate authorities remote from the system, the home owner and/or indeed anyone that has been deemed suitable for contacting, to inform them of a possible intruder, a possible water leak and/or the like. The contact may also include data relating to the location of the temperature changed detected and/or the like.

It will be appreciated by persons skilled in the art that the present invention may also include further additional modifications made to the device which do not affect the overall functioning of the device.

The invention claimed is:

1. A system to provide electric central heating, the system including a plurality of electric radiators, each of said plurality of electric radiators including a control means for controlling one or more parameters, functions and/or characteristics of the electric radiators, and communication means, whereby data concerning all or one or more of the electric radiators can be communicated directly to or between the electric radiators, the control means of each of said plurality of electric radiators being in direct communication with the control means of all or at least two electric radiators of the system such that each control means of each of said plurality of electric radiators is able to independently control itself and at least one other electric radiator of the system;

wherein each of the control means includes a switch for controlling or switching a supply of electrical power to each of the electric radiators according to said one or more parameters, functions and/or characteristics; each of the control means arranged to actuate the switches of two or more of the electric radiators successively in a particular sequence so that the electrical power supplied to the two or more of the electric radiators is pulsed, in that it is repeatedly moved between on and off conditions and/or relatively high and low conditions at a rate sufficiently fast to allow each of the two or more electric radiators to generate heat even when the two or more electric radiators are each in an off or low condition in the particular sequence.

2. The system according to claim 1 wherein the data being communicated between the electric radiators and/or the one or more parameters, functions and/or characteristics being controlled by the electric radiators include any or any combination of a temperature of one or more of the electric radiators, an ambient temperature of a location in which one or more of the electric radiators are located, a temperature variation from a predetermined threshold value or range, an operating and/or functional condition of one or more of the electric radiators, an amount of energy being used by one or more of the electric radiators, a cost of energy being used by one or more of the electric radiators, an amount of carbon being used by one or more of the electric radiators and/or a carbon footprint of one or more of the electric radiators, a time period over which energy consumption for one or more of said electric radiators is defined, a rate or amount of heat loss in a particular locality, a time period over which the switches on the electric radiators are actuated for, data received from outside of the system, weather forecast data, electricity supplier data, electricity tariff data, historical data from another heater system or emergency service data.

3. The system according to claim 2 wherein a value range and/or an upper and/or a lower threshold limit for a particular parameter, function and/or characteristic being controlled and/or data item being communicated is pre-determined and/or can be selected by a user.

4. The system according to claim 3 wherein in order to allow one or more or all of the electric radiators to operate within a range and/or above or below the user selected or pre-determined parameter, function and/or characteristic, at least one of the electric radiators is not switched on all the time or is provided with a reduced electric power supply for part of a total time period.

5. The system according to claim 1 wherein each of the plurality of electric radiators receives electrical power in turn for a pre-determined period of time; with one or more other electric radiators being switched to an off or relatively low power consuming position when one or more electric radiators are switched to an on or relatively high power consuming position.

6. The system according to claim 1 wherein one or more sensors are provided for sensing temperature of each or one or more of the electric radiators, and said sensors are provided on or associated with the electric radiator (s), the control means, the communication means and/or the switch.

7. The system according to claim 1 wherein a user is able to prioritize or order the electric radiators in a hierarchy using the control means of one of the plurality of electric radiators so that a prioritized radiator or a radiator high up in the hierarchy receives electrical power first or in priority to one or more other radiators.

8. The system according to claim 1 wherein each or one or more of the plurality of electric radiators is made from a ceramic and/or glass material in which a heating element is embedded or sandwiched.

9. A method of using an electric central heating system, said electric central heating system including first and at least second electric radiators, wherein each of the first and the at least second electric radiators includes a control means for controlling one or more parameters, functions and/or characteristics of said electric radiator, and each electric radiator includes or has associated therewith communication means, and wherein the control means includes a switch for controlling or switching a supply of electrical power to each of the electric radiators according to said one or more parameters, functions and/or characteristics, the control means arranged to actuate the switch of each of the first and the at least second electric radiators successively in a particular sequence so that the electrical power supplied to the electric radiators is pulsed, in that it is repeatedly moved between on and off conditions and/or relatively high and low conditions at a rate sufficiently fast to allow each electric radiator to be generating heat even when the electric radiator is in an off or low condition in the particular sequence and wherein said method comprises communicating data directly from one of said electric radiators to at least one other of said electric radiators, and the control means of each electric radiator being in direct communication with the control means of all other electric radiators of the system such that each control means of each individual electric radiator is able to independently control itself and at least one other electric radiator of the system; wherein each of the first and at least second electric radiators is made from a ceramic and/or glass material in which a heating element is embedded or sandwiched.

10. The system according to claim 1 wherein a user interface is provided with each of the control means to allow a user to select and/or control said one or more parameters, functions and/or characteristics and/or determine how each of the electric radiators within the system is to be controlled.

11. A system to provide electric heating, the system comprising first and second electric radiators, wherein the first and the second electric radiators each include a control means for controlling one or more parameters, functions and/or characteristics of the first or the second electric radiator, and wherein the control means of each of the first and the second electric radiators includes a switch for controlling or switching a supply of electrical power to each of the first and the second electric radiators according to said one or more parameters, functions and/or characteristics, the control means arranged to actuate the switches of the first and the second electric radiators successively in a particular sequence so that the electrical power supplied to the first and the second electric radiators is pulsed, in that it is repeatedly moved between on and off conditions and/or relatively high and low conditions at a rate sufficiently fast to allow each of the first and the second electric radiators to generate heat even when in an off or low condition in the particular sequence and a communication means, whereby data concerning the first or the second electric radiators can be communicated directly to or between the first and the second electric radiators, the control means of the second electric radiator being in direct communication with the control means of the first electric radiator of the system such that the control means of the first electric radiator is able to independently control itself and the second electric radiator of the system;

wherein the data being communicated between the first and the second electric radiators and/or the one or more parameters, functions and/or characteristics being controlled by the first or the second electric radiators include any or any combination of a temperature of one or more of the first and the second electric radiators, an ambient temperature of a location in which the first or the second electric radiators are located, a temperature variation from a predetermined threshold value or range, an operating and/or functional condition of the first or the second electric radiators, an amount of energy being used by the first or the second electric radiators, a cost of energy being used by the first or the second electric radiators, an amount of carbon being used by the first or the second electric radiators and/or a carbon footprint of the first or the second electric radiators, a time period over which energy consumption for the first or the second electric radiators is defined, a rate or amount of heat loss in a particular locality, a time period over which the switches on the first or the second electric radiators are actuated for, data received from outside of the system, weather forecast data, electricity supplier data, electricity tariff data, historical data from another independent heating system or emergency service data;

wherein each of the first electric radiator and the second electric radiator includes ceramic or glass material in which a heating element is embedded or sandwiched.

12. The system according to claim 1 wherein a fraction of the plurality of electric radiators are switched on at any specific time.

13. The system according to claim 1 wherein a length of time each of the plurality of electric radiators is provided with a pulsed electric supply is equal to a second in time divided by a number of radiators in the system.

14. The system according to claim 1 wherein the pulsed rate is such that the plurality of radiators are heated while using a same amount of electrical power as for heating one of the radiators of said plurality of radiators.

* * * * *